(12) United States Patent
Kharate et al.

(10) Patent No.: US 12,530,183 B2
(45) Date of Patent: *Jan. 20, 2026

(54) FRAMEWORK FOR AUTOMATED PRODUCTIZATION IN TELECOMMUNICATIONS NETWORKS

(71) Applicant: T-Mobile USA, Inc., Bellevue, WA (US)

(72) Inventors: Sanjay Laxman Kharate, Bothell, WA (US); Michael A. Kovalcik, Overland Park, KS (US); Robert Brewster, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 555 days.

This patent is subject to a terminal disclaimer.

(21) Appl. No.: 17/899,499

(22) Filed: Aug. 30, 2022

(65) Prior Publication Data

US 2024/0069885 A1    Feb. 29, 2024

(51) Int. Cl.
*G06F 8/41* (2018.01)
*G06F 8/65* (2018.01)
*G06F 8/70* (2018.01)
*H04W 4/50* (2018.01)

(52) U.S. Cl.
CPC .......... *G06F 8/65* (2013.01); *G06F 8/443* (2013.01); *G06F 8/70* (2013.01); *H04W 4/50* (2018.02)

(58) Field of Classification Search
CPC ... G06F 8/443; G06F 8/65; G06F 8/70; G06F 11/3457; G06F 30/20; G06N 20/00
See application file for complete search history.

(56) References Cited

U.S. PATENT DOCUMENTS

| | | |
|---|---|---|
| 6,411,936 B1 | 6/2002 | Sanders |
| 7,191,435 B2 | 3/2007 | Lau et al. |
| 7,702,499 B1 | 4/2010 | Lavagno et al. |
| 7,860,699 B2 | 12/2010 | Dowski et al. |
| 7,860,810 B2 | 12/2010 | Raffo |

(Continued)

FOREIGN PATENT DOCUMENTS

| | | |
|---|---|---|
| CN | 101031920 A | 9/2007 |
| CN | 105765561 B | 6/2020 |

(Continued)

*Primary Examiner* — Marina Lee
(74) *Attorney, Agent, or Firm* — Perkins Coie LLP

(57) ABSTRACT

A system obtains productization data of systems that support productization of a software product for a telecommunications network. The system can identify enabling elements of a particular system, where the enabling elements are adjustable to change a productization process of the software product. The system can classify each enabling element based on a capability of the enabling element to affect performance of the software product or the telecommunications network. The system can create a computer model for productization of the software product based on the classified enabling elements. The system can simulate, based on the computer model, a change to the software product or the particular system and a resulting impact on the productization process of the software product. The system can generate a network interface to check and optimize productization of the software product or another product based on the same model.

18 Claims, 4 Drawing Sheets

(56) References Cited

U.S. PATENT DOCUMENTS

| | | |
|---|---|---|
| 7,890,924 B2 | 2/2011 | Raffo |
| 7,937,281 B2 | 5/2011 | Miller et al. |
| 8,090,611 B2 | 1/2012 | Hodges et al. |
| 8,150,726 B2 | 4/2012 | Merrifield et al. |
| 8,195,504 B2 | 6/2012 | Merrifield et al. |
| 8,352,226 B2 | 1/2013 | Cullick et al. |
| 8,375,370 B2 | 2/2013 | Chaar et al. |
| 9,519,477 B2 | 12/2016 | Champlin-scharff et al. |
| 9,798,474 B2 | 10/2017 | Barzik et al. |
| 9,875,174 B1 | 1/2018 | Brandwine et al. |
| 10,229,028 B2 | 3/2019 | Addleman et al. |
| 10,346,204 B2 | 7/2019 | Ginis et al. |
| 10,484,891 B2 | 11/2019 | Polepalli |
| 10,599,992 B1 | 3/2020 | Cohen et al. |
| 10,613,710 B2 | 4/2020 | Malkosh |
| 10,664,784 B2 | 5/2020 | Argyros et al. |
| 10,785,122 B2 | 9/2020 | Inamdar et al. |
| 10,809,936 B1 * | 10/2020 | Kaushik ............ G06N 5/04 |
| 10,891,128 B1 | 1/2021 | Tafas et al. |
| 11,030,080 B2 | 6/2021 | Chandra |
| 11,093,884 B2 | 8/2021 | Devarakonda et al. |
| 11,113,704 B2 | 9/2021 | Towriss |
| 11,216,261 B1 | 1/2022 | Moyal et al. |
| 11,238,372 B2 * | 2/2022 | Nag ................ G06F 30/20 |
| 11,269,627 B1 | 3/2022 | Kim et al. |
| 11,282,022 B2 | 3/2022 | Devarakonda et al. |
| 11,379,748 B2 | 7/2022 | Krishnamoorthy et al. |
| 11,770,307 B2 * | 9/2023 | Veggalam ......... H04L 41/5019 |
| 11,989,429 B1 * | 5/2024 | Abrol ............. G06F 3/0605 |
| 2003/0033191 A1 | 2/2003 | Davies et al. |
| 2004/0148047 A1 | 7/2004 | Dismukes et al. |
| 2004/0210509 A1 | 10/2004 | Eder |
| 2006/0190310 A1 | 8/2006 | Gudla et al. |
| 2007/0006177 A1 | 1/2007 | Aiber et al. |
| 2008/0040364 A1 | 2/2008 | Li |
| 2009/0271342 A1 | 10/2009 | Eder |
| 2009/0276265 A1 * | 11/2009 | Ahmed ............. G06Q 10/06 709/226 |
| 2010/0299128 A1 | 11/2010 | Aiber et al. |
| 2011/0087522 A1 | 4/2011 | Beaty et al. |
| 2012/0290505 A1 | 11/2012 | Eder |
| 2012/0303504 A1 | 11/2012 | Eder |
| 2013/0031035 A1 | 1/2013 | Jeanne et al. |
| 2013/0151691 A1 | 6/2013 | Etgen et al. |
| 2016/0092890 A1 | 3/2016 | Bhamidipati et al. |
| 2018/0005249 A1 | 1/2018 | Dhanyamraju et al. |
| 2019/0213551 A1 | 7/2019 | Zhou et al. |
| 2019/0378074 A1 * | 12/2019 | McPhatter ......... G06Q 10/067 |
| 2020/0102812 A1 | 4/2020 | Alhuraifi et al. |
| 2020/0151619 A1 * | 5/2020 | Mopur ............. H04L 67/12 |
| 2020/0209811 A1 | 7/2020 | Devarakonda et al. |
| 2020/0233932 A1 | 7/2020 | Repaka et al. |
| 2020/0334539 A1 | 10/2020 | Wang et al. |
| 2020/0356819 A1 | 11/2020 | Kempter et al. |
| 2020/0410355 A1 | 12/2020 | Zhu et al. |
| 2021/0081836 A1 | 3/2021 | Polleri et al. |
| 2021/0081837 A1 | 3/2021 | Polleri et al. |
| 2021/0089624 A1 | 3/2021 | Bealby-wright et al. |
| 2021/0099378 A1 | 4/2021 | Alaettinoglu et al. |
| 2021/0240599 A1 | 8/2021 | Ma et al. |
| 2021/0263508 A1 | 8/2021 | Wang et al. |
| 2021/0279562 A1 | 9/2021 | Cmielowski et al. |
| 2022/0150128 A1 * | 5/2022 | Adhav ............. H04L 41/145 |
| 2022/0150281 A1 | 5/2022 | Kanungo et al. |
| 2022/0244954 A1 | 8/2022 | Kim et al. |
| 2022/0253426 A1 | 8/2022 | Zhu et al. |
| 2023/0117824 A1 * | 4/2023 | Coster ............. G06F 30/20 703/21 |

FOREIGN PATENT DOCUMENTS

| | | |
|---|---|---|
| CN | 111316238 A | 6/2020 |
| CN | 112068522 A | 12/2020 |
| CN | 112424998 A | 2/2021 |
| CN | 112488534 A | 3/2021 |
| CN | 112527495 A | 3/2021 |
| CN | 112580775 A | 3/2021 |
| CN | 113169886 A | 7/2021 |
| CN | 113610419 A | 11/2021 |
| CN | 113692595 A | 11/2021 |
| CN | 113741216 A | 12/2021 |
| DE | 102019219067 A1 | 6/2021 |
| EP | 1285373 A1 | 2/2003 |
| EP | 1692558 A2 | 8/2006 |
| EP | 1769416 A1 | 4/2007 |
| EP | 1982046 B1 | 3/2011 |
| EP | 2836798 A1 | 2/2015 |
| EP | 2873013 A1 | 5/2015 |
| EP | 3114620 A1 | 1/2017 |
| EP | 3161733 A1 | 5/2017 |
| EP | 3221821 A1 | 9/2017 |
| EP | 3245615 A2 | 11/2017 |
| EP | 2817734 B1 | 5/2018 |
| EP | 3440543 A1 | 2/2019 |
| EP | 3625677 A1 | 3/2020 |
| EP | 3792755 A1 | 3/2021 |
| EP | 3840295 A1 | 6/2021 |
| EP | 1984860 B1 | 6/2022 |
| JP | 2007513427 A | 5/2007 |
| JP | 2009517779 A | 4/2009 |
| JP | 2012523644 A | 10/2012 |
| JP | 5841071 B2 | 11/2015 |
| JP | 6509225 B2 | 4/2019 |
| JP | 2020519993 A | 7/2020 |
| JP | 2020522055 A | 7/2020 |
| JP | 6892704 B2 | 6/2021 |
| JP | 6935107 B2 | 8/2021 |
| KR | 20080072955 A | 8/2008 |
| KR | 101561161 B1 | 10/2015 |
| KR | 102279120 B1 | 7/2021 |
| KR | 20210143947 A | 11/2021 |
| WO | 0046721 A1 | 8/2000 |
| WO | 0116838 A2 | 3/2001 |
| WO | 0203225 A2 | 1/2002 |
| WO | 0250699 A1 | 6/2002 |
| WO | 2005054927 A2 | 6/2005 |
| WO | 2006007443 A1 | 1/2006 |
| WO | 2007089829 A2 | 8/2007 |
| WO | 2007089832 A1 | 8/2007 |
| WO | 2008060643 A2 | 5/2008 |
| WO | 2011147048 A1 | 12/2011 |
| WO | 2012027004 A1 | 3/2012 |
| WO | 2015089231 A1 | 6/2015 |
| WO | 2016004075 A1 | 1/2016 |
| WO | 2018154331 A1 | 8/2018 |
| WO | 2020106501 A1 | 5/2020 |
| WO | 2020146230 A1 | 7/2020 |
| WO | 2020227383 A1 | 11/2020 |
| WO | 2021025778 A1 | 2/2021 |
| WO | 2021050391 A1 | 3/2021 |
| WO | 2021051031 A1 | 3/2021 |
| WO | 2021121585 A1 | 6/2021 |
| WO | 2021150717 A1 | 7/2021 |
| WO | 2021185517 A1 | 9/2021 |

\* cited by examiner

FRAMEWORK FOR AUTOMATED PRODUCTIZATION IN TELECOMMUNICATIONS NETWORKS

BACKGROUND

The telecommunications industry continues to evolve, as networks become more complex and technologies advance rapidly. To compete for more subscribers, network carriers seek to reduce the costs of productization and improve subscriber services. Productization refers to developing or modifying a product, such as a software program, to make it suitable as a commercial product. To satisfy subscriber demands for high quality communications, network carriers design and test new products to ensure that they satisfy rigorous standards and provide reliable performance. Productization involves initial ideation, research, and prototyping before launching. A productization process can have multiple phases that involve systems (e.g., software, hardware) and teams of people to advance a product from concept to launch. An initial phase of the productization begins by generating product ideas that consider factors such as functionality of the product. Later phases involve feature definition, prototyping, design, testing, and commercialization.

As technology advances, productization environments become more complex and productization becomes more challenging. For example, applications, systems, and communications networks are constantly under various new constraints and requirements. A productization lifecycle can introduce security and other considerations throughout all phases of the productization process, helping developers build highly secure and reliable software products, address compliance requirements, and reduce productization costs. In one example, productizing includes defining conditions for how services are rendered while keeping workload at a sustainable level. Productization thus allows for a method of creating, producing, and distributing the creative or intellectual capital being offered to current clients.

BRIEF DESCRIPTION OF THE DRAWINGS

Detailed descriptions of implementations of the present invention will be described and explained through the use of the accompanying drawings.

Figure 1:
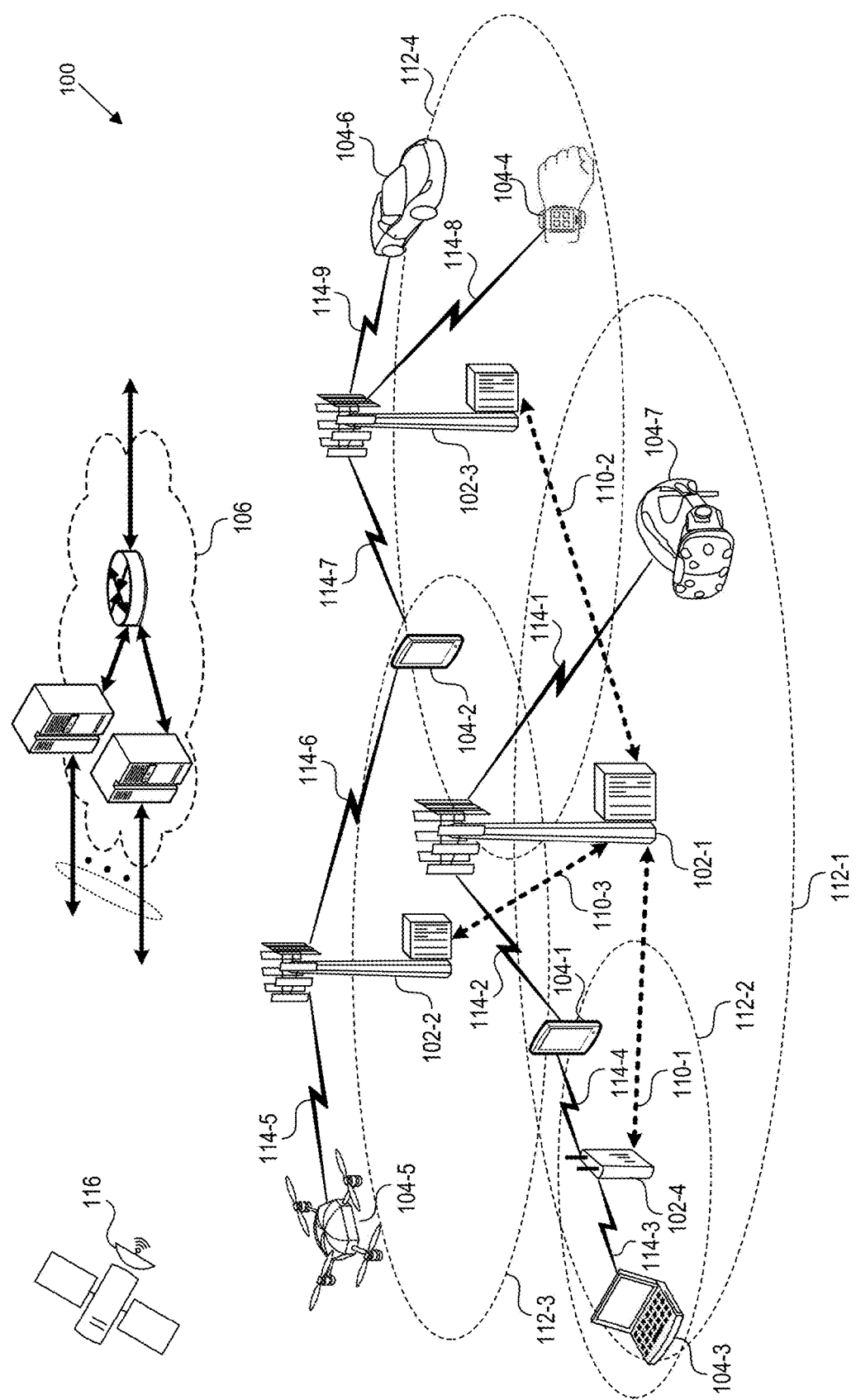
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a framework for a computer-implemented system configured to create a productization model ("model") that interconnects different systems and processes that can be used to harmonize productization of different products. Examples of products include a software program or a service for a telecommunications network. In one example, an embedded Subscriber Identity Module (eSIM) is a product of a productization process that is developed or modified in accordance with specifications, rules, or constraints. The productization can involve standardizing, testing, or packaging the eSIM for deployment.

The system can create the model for productization by discovering elements (e.g., features) of systems that are adjustable to standardize and optimize productization. The model can include components configured to align and weight elements that enable the productization process or functions of the product. A component can decompose a productization process into one or more elements of systems that support functions of the product. For example, a productization process can be decomposed into elements of systems for development and/or testing software modules that perform different functions of a software product. The model can select and align (e.g., order) one or more of the elements to simplify, accelerate, scale, increase resiliency, and reduce waste in productization.

The component can identify a theme for productization. As used herein, a "theme" can refer to an abstraction based on a pattern of coherent business and/or technical functionality in a strategic area in enterprise for significant value and optimization. Examples of themes in the telecommunications industry include: eSIM, segmentation, device unlock, next best action, autopay, network products, commerce, fraud, compliance, and payments. A theme can be identified by aligning technical, business, and marketing systems ahead of execution of phases in productization. The model can drive for broader directional alignment. The theme and associated elements can be used to estimate a timeline for productization. In one example, a timeline and cost estimation is a directional high-level estimate data captured ahead of execution by collaboration with key subject matter experts (SMEs) in enterprise based on complexity, domain knowledge, and count of synthesized elements under the theme and capacity with skills/technologies. The model can synthesize a theme for an architecture from a feature set based on a productization roadmap, to align the features with technical roadmaps. In one example, the system creates an architecture for productization of a telecommunications software product that supports communication services. The model can create architectures for productization from early-stage ideation through product deployment in telecommunications and including finance, enterprise, supply chain, emerging, artificial intelligence (AI) and machine learning (ML) technologies, etc.

Another component of the model can discover one or more elements that can be weighted to achieve a desired scalability, extensibility, and speed. In examples that implement an ML model, the weighted element can be used to train the model, to identify and predict other elements for productization. The model can thus increase collective intelligence from multiple productization processes via shared knowledge, and communications about elements, with early engagement for alignment in a common direction for productization. The component enables dynamic weighting of enterprise, technical, domain and reference systems. The component can thus broaden knowledge sharing of technical intelligence across domains. The technical intelligence can operate to achieve an objective for an enterprise with a robust architecture that achieves development and operational costs synergies and improve extensibility.

The model can have modes to respond to reactive or proactive disruptions to a productization process. In a reactive mode, the model is trained to adapt to disruptions to a productization process. In the proactive mode, the system can perform proactive optimizations that adjust a productization process in anticipation of new innovations or technologies in, for example, 5G or 6G and in new markets and product lines, as well as changes in service providers.

Another component can provide proactive engagement with technical domain architects and experts to provide line-of-business perspectives across a product roadmap, initiatives, and concepts to enable foundational, cross domain/brand products to leverage, identify duplicate domain feature sets to break silos and opportunities for consolidation based on bounded context and to minimize technical problems.

In one example, the system enables dynamic productization of multiple device types across different carrier infrastructures that require different processes including different or incompatible functions. Further, the technology can be leveraged by various carrier initiatives and products to simplify migration and conversion by providing a common platform to address a network's productization processes to accelerate operational efficiencies. The technology can include dashboards and reporting tools for managing the productization processes. The technology can also include a tool to remotely address and enable requests, improve customer experience, and reduce offline support of productization processes.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (VVWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio System Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum systems) or Time division duplex (TDD) operation (e.g., using unpaired spectrum systems). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification. The network 100 can enable terrestrial and non-terrestrial transmissions. In this context, a Non-Terrestrial Network (NTN) is enabled by one or more satellites such as satellite 116 to deliver services anywhere and anytime and also provide coverage in areas that are unreachable by any conventional Terrestrial Network (TN). The 6G network 100 can implement terahertz (THz) communications. This will support wireless applications that demand ultra-high quality of service requirements and multi-terabits per second data transmission in the 6G and beyond era, such as terabit-per-second backhaul systems, ultrahigh-definition content streaming among mobile devices, virtual/augmented reality, and wireless high-bandwidth secure communications.

Framework for Automating Productization

Figure 2:
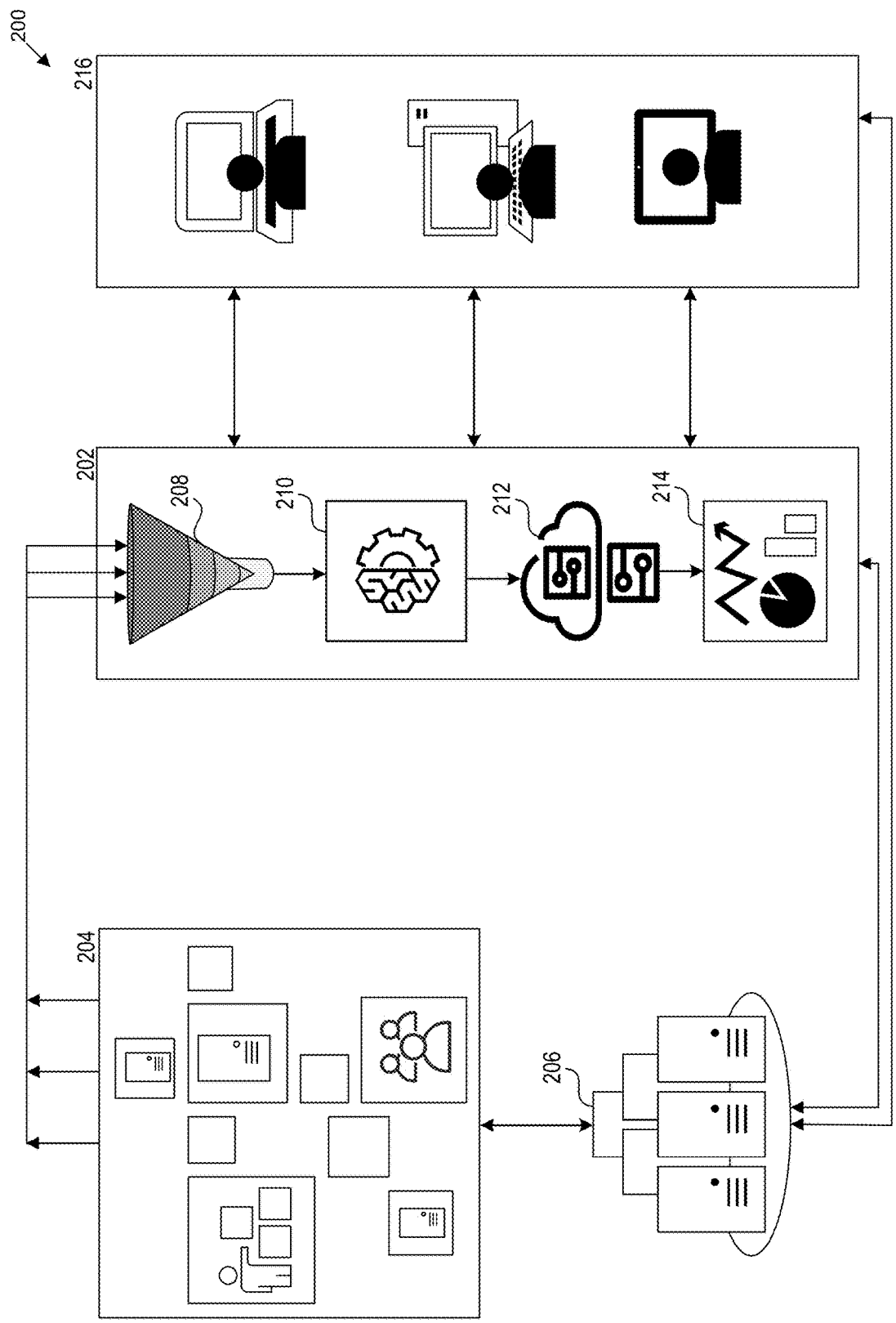
FIG. 2 is a block diagram that illustrates a system for automating and optimizing productization.

FIG. 2 is a block diagram that illustrates a system for automating and optimizing productization. The system 200 can dynamically create and/or adjust a model for productization, which can be used to develop or modify productization particularly in telecommunications. That is, a telecommunications carrier has productization processes in place for software and services of a network, which can be improved, expanded, and reused for other products based on the system 200.

The system 200 includes an orchestration engine 202 ("engine 202") that is configured to obtain data from multiple systems 204 of productization processes. The system 200 includes a repository 206 that stores data and information about productizations. The repository 206 can thus serve as a repository for data generated by the multiple systems 204 or information about those systems. The multiple systems 204 can include an on-premises system of an enterprise or systems that are external to the enterprise. The engine 202 can be a rules-based engine that includes a data mining component 208, a modeling component 210, a simulation component 212, and analytics and reporting component 214.

The multiple systems 204 include one or more nodes that have hardware (e.g., circuits, processors, memory, network interfaces) and/or software (e.g., operating systems, applications). In one example, the multiple systems 204 have components of a telecommunications network including testing nodes, network nodes, etc. In that example, the repository can store application data of network subscribers or of a third-party service.

In one example, the multiple systems 204 can include user reporting tools or sensors disposed thereon or located thereat. The sensors can measure physical properties of nodes or surroundings including, for example, network loads, capacities (e.g., storage, processing), and any other measures that are indicative of the performance of a system or its components. As used here, "productization data" can refer to reference data captured in a system by collaboration with key SMEs in relevant areas for theme productization. In one example, the productization data can be used to determine values for performance metrics such as a power-handling capability of a processing system at a particular state or within a range of capacity utilizations. As such, the productization data can use different formats or taxonomies, and/or conform with different protocols.

The productization data can be communicated in data streams from the multiple systems 204 to the engine 202. The productization data can be periodically communicated (e.g., every 5 minutes, twice daily) to the engine 202, which is configured to, for example, perform data mining including standardization, which enables analytics based on a simulation of the impact on one or more systems for a target product in response to a change (e.g., a simulated change) to a productization process.

The data mining component 208 can implement processes for filtering productization data to extract and discover patterns that can be used to configure productization processes. The data mining component 208 has an overall goal of extracting productization data from datasets for transforming the extracted data into information that has a comprehensible structure for further use. The data mining can also involve database and data management, data pre-processing, model and inference considerations, complexity considerations, post-processing of discovered structures, visualization, etc. The data mining component 208 can standardize productization data to have a common format or use a common taxonomy. Further, the productization data can be classified for a particular performance metric. For example, the data mining component 208 can extract performance measurements of productization systems and classify the productization data in terms of the locations of sensors that captured the measurements, the types of devices on which the sensors are attached, and/or other dimensions that can be used for classifying the productization data. In another example, the data mining component 208 performs data aggregation to compile data extracted from datasets and combines the extracted data to prepare new datasets to optimize processing by other components of the engine 202.

The data mining component 208 can determine a theme for productization data. A theme is input to the modeling component 210 to find a matching theme from among multiple themes. The modeling component 210 can define instructions to re-use processes based on prior rationalizations, which have been previously performed or used to extend/create new product areas. As used herein, a "rationalization" can refer to an activity involving identification of a product area (e.g., abstraction) and synthesizing high-level elements of a product with a business focus while keeping a technical and architecture underpinning lens to scale and sustain the product over a long period of time for continuous value. A rationalization can involve a knowledgebase from key SMEs, and broad enterprise functional knowledge to extract appropriate information and context for productization. A rationalization can vary from theme to theme. The system then generates a model for a new theme or updates an existing theme of a model, as needed for collaboration. The modeling component 210 can also identify common patterns and high-level product areas to rationalize.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, a model for a productization process can include a neural network with multiple input nodes that receive productization data. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used to create or update productization models. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A model can be trained with supervised learning, where the training data includes productization data as input and a desired output, such as an architecture for a productization process. A representation of a productization process can be provided to the model. Output from the model can be compared to the desired output for that productization process and, based on the comparison, the model can be modified, such as by changing weights between nodes of the neural network or parameters of the functions used at each node in the neural network (e.g., applying a loss function). After applying each of the themes in the training data and modifying the model in this manner, the model can be trained to evaluate new themes and productization processes.

In one example, the ML algorithms can build a model based on sample productization data (e.g., "training data") to enable forecasting or making predictions or decisions as to the future state of productization based on a simulated change to the same or another productization process. In another example, the modeling component 210 includes a cataloging function that is created an updated manually based on the standardized productization data such that the impact of a performance metric for a target productization process can be predicted when comparing data against the catalog of productization data and performing interpolation or other numerical, computational, or statistical methods to extrapolate how a change can impact the performance of a target process or another process.

The simulation component 212 can simulate the impact of a change on one or more productization processes, the associated product, or associated telecommunications network. For example, the simulation component 212 can simulate the effect of expanding a productization system used for a productization process of a particular mobile application on end user devices of the telecommunications network. In other words, the simulation component 212 generates an imitation of a system and/or process of a real-world system or process based on productization data. The simulations require the use of models generated by the modeling component 210, which represent key characteristics or behaviors of productization processes, whereas the simulation represents the evolution of the model over time or in response to a change in the modeled productization processes.

The analytics and reporting component 214 can include different functions for productization teams, where the functions provide automation, training, support, troubleshooting, dashboards, and reporting. Examples of reporting include ad hoc data reporting, visualization, self-service reporting, and data science analytics. The analytics and reporting component 214 can generate and/or administer a network portal. An example includes an online web-based portal that can display the simulation or associated data in visualizations or other user-friendly features that enable end users 216 to investigate the simulation. The analytics component 214 enables exploration and investigation of past performance to predict future performance in different scenarios and different products. The analytics component 214 utilizes statistical methods to form a data-driven understanding of a target system and associated productization systems, and to develop new insights into the performance of the multiple systems 204.

The end users 216 include any end user devices operable by users or computing devices that are authorized to access components or data processed by the engine 202. In one example, the end users 216 are assigned roles that grant access to one, any, or all components of the engine 202. For example, an end user with a reviewer role is only permitted access to the analytics component 214 whereas an end user with an administrator role is permitted to access all of the components of the engine 202 to, for example edit the model of the modeling component 210 or modify how datasets are aggregated by the data mining component 208.

The engine 202 can respond to disruptions in productization processes. A productization process can be affected with reactive disruptions or proactive disruptions. In one example, the system 200 identifies a theme for a productization process based on information from business and technical domains. An example of a reactive disruption in an organization includes new or significant demands to change direction, prioritization, and systems having impacts to current priorities to respond from external/internal drivers. The system 200 can thus provide directional guidance to keep optimization, growth, simplification, and acceleration in focus while addressing reactive disruptions from business value perspective. In one example, a disruption arises due to a corporate directive, a change in a line-of-business objective, a vision or roadmap, and new technologies.

The system 200 can generate rationalizations based on themes and which consider disruptions to productization timelines, to make adjustments that align with the themes. For example, the system can enable collaboration in response to updates or obsolete themes and can prioritize themes. The system 200 can also identify high value/foundational/isolated themes to optimize value in parallel with disruptions. Further, the system can keep a horizontal focus intact (e.g., compliance/security) despite disruptions.

The system 200 can address proactive disruptions as well. A proactive disruption can arise due to expected or predicted standards or regulations that would affect productization. Other examples of proactive disruptions include emerging technologies across lines-of-business and communication channels, which influence engineering of new products and extending existing products. The system can thus dynamically address operational efficiencies to handle regulatory changes, certification, security, privacy, monitoring, logging, traceability, testing, and provide dashboards with visualizations.

Figure 3:
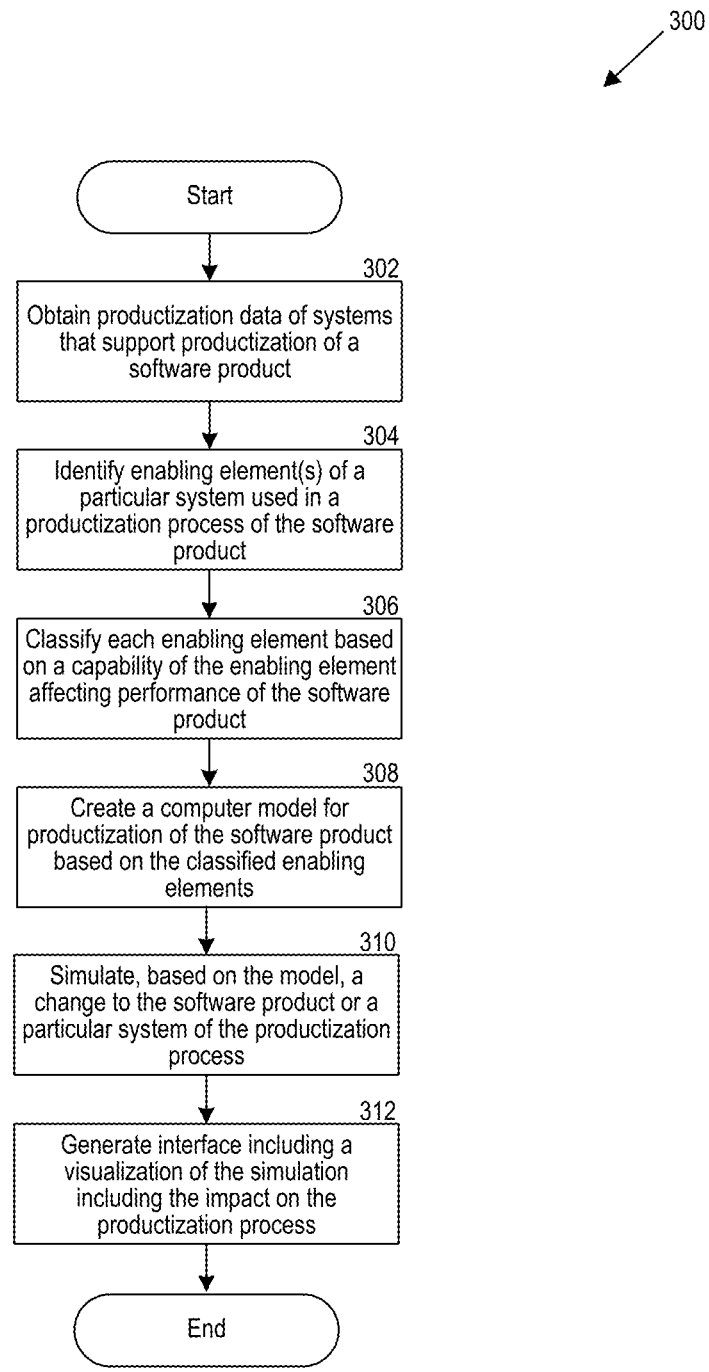
FIG. 3 is a flowchart for automating and optimizing a productization process.

FIG. 3 is a flowchart for automating and optimizing a productization process. A process 300 can be performed by a system (e.g., system 200) including an orchestration engine (e.g., engine 202). In one example, the system predicts an impact on a productization process in response to a simulated change including an update to a software product or change to a particular system (e.g., datacenter) that supports a productization process for the software product. The simulated change can include an update to the software product running on a wireless device, a change to a particular system that supports the productization process, or a change to a telecommunications network on which the wireless device is subscribed.

At 302, the system can obtain productization data of multiple systems that support productization of a software product for a telecommunications network (e.g., a diagnostics app for a wireless device). The productization data can be input to the system from users of domains (e.g., technical, business teams) and/or include data generated by sensors disposed on the multiple systems. In one example, the multiple systems include processing systems of the telecommunications network and a sensor on a particular system that supports the productization process can monitor for utilization or power consumption.

At 304, the system can identify one or more enabling elements of a particular system of the multiple systems. The one or more enabling elements are adjustable to change a productization process of the software product. As used herein, enabling elements or "enablers" can refer to generic, reusable or common functions (e.g., components) that can be leveraged, modular, and/or plugged-in multiple subsystems or components across an enterprise to avoid duplicate efforts and optimize build and operational costs.

At 306, the system can classify each enabling element based on a capability of the enabling element that impacts performance of the software product, performance of the device on which the software product operates, and/or performance of the associated telecommunications network. In one example, the system can standardize the productization data across the multiple systems, or across layers of abstraction for the multiple systems (e.g., hardware, software, or a service). The system can aggregate productization data based on the levels of abstraction or across different dimensions. For example, the system can aggregate the productization data based on a spatial dimension to classify the aggregated data based on where the productization data is collected (e.g., locations of domains, sensors). The productization data is thus standardized and classified based on a spatial dimension. In another example, the system aggregates productization data across a temporal dimension to classify the aggregated data to timeframes when the productization data was generated, captured, or communicated to the system.

At 308, the system can create a computer model (e.g., ML model) for productization of the software product based on the classified enabling elements. For example, the system can classify the productization data based on hardware or software components of the multiple networks. The model is then optimized in accordance with the classification of the hardware or software components. In one example, the model is purely rules-based. In another example, the system classifies the productization data based on the spatial dimension or the temporal dimension and the rules-based or ML model is optimized in accordance with the classification of the spatial dimension or the temporal dimension. In yet another example, the system can train the model to optimize for a performance metric based on a classified productization data. The system can then use the model to simulate an impact of a change to the software product, a device running the software product, or an associated telecommunications network on the performance metric.

At 310, the system simulates, based on the model, a change to the software product or a particular system of the multiple systems that support the productization process. The system can also simulate a resulting impact on the performance metric associated with the software product. In one example, the change to the particular system includes an update to the software product or an expansion/contraction of the particular system (e.g., add/remove memory). The system can predict an impact on the telecommunication network in response to a simulated change (e.g., expansion in a network infrastructure). In another example, the system can predict, based on a changed productization process of the software product, an impact on network access to the telecommunications network in response to a simulated deployment of the software product on a mobile device on the telecommunications network. With the trained model, the system can make predictions and enable optimizations of other products or productizations processes that are similar to the software product on which the model was built. For example, the model can be used to make predictions about adjacent software products (e.g., mobile apps or operating system) or newer versions of a software product.

At 312, the system can generate or administer a network interface that presents a visualization of the simulation including the impact on the performance metric for the productization process, associated devices, or the telecommunications network. The network interface enables an end user to interact with the visualization. The network interface can include an indication of a procedure to optimize the impact on the performance metric. In one example, the system can generate an interactive decision-making tool that enables real-time analytics with respect to a performance metric and a risk to the telecommunications network based on the simulated change. In one example, the system can predict, based on the model, an impact on a cost metric in response to the simulated change to a particular system that supports the productization process, and the network interface includes the predicted impact on the cost metric and a procedure for reducing the cost metric.

Computer System

Figure 4:
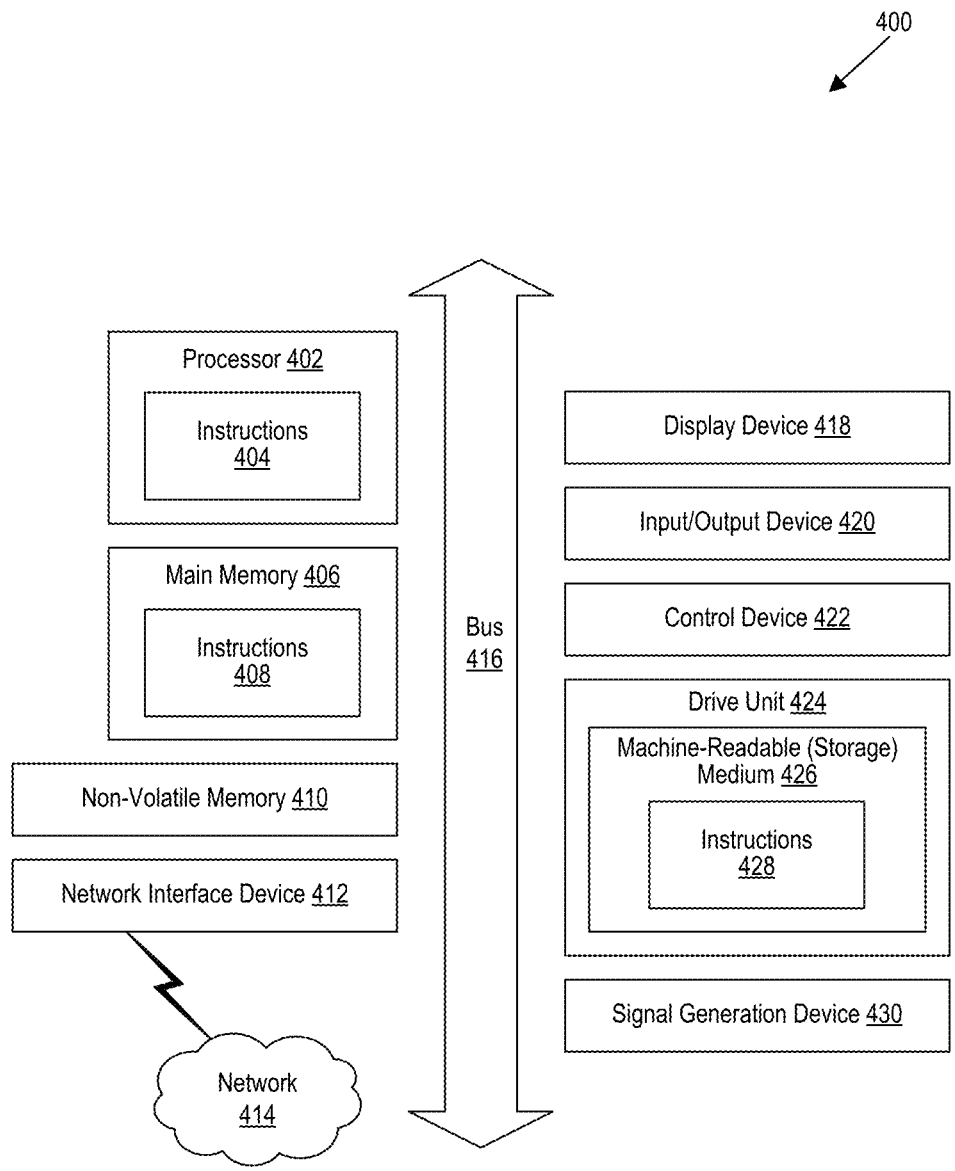
FIG. 4 is a block diagram that illustrates an example of a computer system in which at least some operations described herein can be implemented.

FIG. 4 is a block diagram that illustrates an example of a computing system 400 in which at least some operations described herein can be implemented. As shown, the computing system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

The computing system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computing system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-readable storage medium, excluding transitory signals and carrying instructions, which, when executed by at least one data processor of a system, cause the system to:

obtain, in real-time, productization data of multiple systems that support productization of a software product for a telecommunications network,
wherein the productization data is obtained from testing nodes and network nodes of the telecommunications network;
wherein the productization data is indicative of utilization or consumption of the testing nodes and the network nodes;
identify one or more enabling elements of a particular system of the multiple systems, wherein the one or more enabling elements are adjustable functions of the particular system of the multiple systems;
wherein the one or more enabling elements, upon adjustment, are configured to change a productization process of the software product;
classify the one or more enabling elements based on a capability of each enabling element to affect performance of the software product or the telecommunications network;
create a computer model for productization of the software product based on the classified enabling elements;
simulate, based on the computer model, a change to the software product or the particular system of the multiple systems that support the productization of the software product,
wherein the simulated change to the software product or the particular system causes an impact on the productization of the software product;
wherein the simulated change includes an update to the software product or an expansion or contraction of the particular system;
identify, via the computer model, a procedure to optimize the impact on the productization of the software product based on the simulated change; and
generate, in real-time, a network interface that presents the procedure to optimize the impact on the productization of the software product and a visualization based on the simulation that includes the impact on the productization of the software product,
wherein the network interface is generated based on the productization data, the classified one or more enabling elements, the change to the software product or the particular system, and the procedure to optimize the impact on the productization of the software product;
wherein generating the network interface in real-time enables an end user to interact with the visualization.

2. The computer-readable storage medium of claim 1, wherein to simulate the change to the software product or the particular system comprises causing the system to:
predict an impact on the telecommunications network in response to a simulated expansion in a network infrastructure that supports a wireless device running the software product.

3. The computer-readable storage medium of claim 1, wherein to simulate the change to the software product or the particular system comprises causing the system to:
predict an impact on network access to the telecommunications network in response to a simulated deployment of a mobile application on multiple mobile devices on the telecommunications network.

4. The computer-readable storage medium of claim 1:
wherein the particular system corresponds to a datacenter of the telecommunications network, and
wherein the network interface includes runnable code or presents text related to the simulation of an impact on the telecommunications network.

5. The computer-readable storage medium of claim 1, wherein the system is further caused to:
predict, based on the model, an impact on a cost metric in response to the simulated change to the particular system,
wherein the network interface includes the predicted impact on the cost metric and a procedure for reducing the cost metric.

6. The computer-readable storage medium of claim 1, wherein to generate the network interface comprises causing the system to:
generate an interactive decision-making tool that enables real-time analytics with respect to a performance metric and a risk to the telecommunications network based on the simulated change.

7. The computer-readable storage medium of claim 1:
wherein the multiple systems include multiple processing systems of the telecommunications network,
wherein the particular system is a particular processing system of the multiple processing systems, and
wherein the impact on the productization process of the software product includes an indication of utilization of the processing system.

8. The computer-readable storage medium of claim 1, wherein the multiple systems include a physical hardware system, a software system of the physical hardware system, an application of the system software, and a service of the application.

9. The computer-readable storage medium of claim 1, wherein the system is caused to:
aggregate datasets of the productization data across a spatial dimension to classify the one or more enabling elements across the multiple systems, and
wherein the classification of the one or more enabling elements is based on the spatial dimension and the computer model is generated based on the aggregate productization data.

10. The computer-readable storage medium of claim 1, wherein the system is caused to:
aggregate datasets of the productization data across a temporal dimension to classify the one or more enabling elements across the multiple systems into one or more timeframes when the productization data was generated or captured, and
wherein the classification of the one or more enabling elements is based on the temporal dimension and the computer model is generated based on the aggregate productization data.

11. The computer-readable storage medium of claim 1, wherein to simulate the change to the software product or the particular system of the multiple systems impacting the productization process comprises causing the system to:
determine an impact to the telecommunications network based on a change to the software product,
wherein the impact is based on a performance metric.

12. A system comprising:
at least one hardware processor; and
at least one non-transitory memory storing instructions, which, when executed by the at least one hardware processor, cause the system to:
obtain, in real-time, productization data of multiple systems that support a productization process of a software product for a telecommunications network,
wherein the productization data is obtained from testing nodes and network nodes of the telecommunications network;
standardize the productization data into a common format and into a classification for a performance metric,
wherein the performance metric includes a capability of the multiple systems to support productization of the software product;

optimize a rules-based or machine learning (ML) model for the performance metric based on the standardized productization data and in accordance with the classification;

simulate, based on the rules-based or ML model, an impact on the performance metric in response to a simulated change of a target system of the multiple systems;

identify, via the rules-based or ML model, a procedure to optimize the impact on the performance metric based on the simulated change of the target system;

generate, in real-time, a network portal that presents the procedure to optimize the impact on the performance metric,
- wherein the network portal is generated based on the standardized productization data, the performance metric, the classification, and the simulated change of the target system;
- wherein the network portal generated in real-time enables interactive analytics for engaging with the simulation and the impact on the performance metric; and predict an impact on the productization process in response to the simulated change including a simulated update to the software product or change to the target system.

13. The system of claim 12 further caused to, prior to the impact on the performance metric being simulated:

classify the productization data based on hardware or software components of the multiple systems,
- wherein the rules-based or ML model is optimized in accordance with the classification of the hardware or software components.

14. The system of claim 12 further caused to, prior to the impact on the performance metric being simulated:

classify the productization data based on a spatial dimension or a temporal dimension,
- wherein the rules-based or ML model is optimized in accordance with the classification of the spatial dimension or the temporal dimension.

15. A method for simulating a change to a productization system of a productization process and a corresponding impact on a performance metric for the productization process, the method comprising:

receiving, in real-time, productization data generated by multiple sensors disposed on components of the productization system,
- wherein the components include testing nodes and network nodes associated with a telecommunications network;
- wherein the productization data is indicative of utilization or consumption of the components associated with the telecommunications network;

classifying the productization data generated by the multiple sensors based on a performance metric for the productization system,
- wherein the performance metric describes a performance of the telecommunications network;

simulating, based on the classified productization data, an impact on the performance metric in response to a simulated change to the productization system,
- wherein the simulated change to the productization system includes an update to software running on the productization system or a hardware expansion of the productization system; and generating a network portal in real-time based on the classified productization data, the impact on the performance metric, and the simulated change to the productization system,
- wherein the network portal including real-time analytics of the productization system,
- wherein the real-time analytics of the productization system enables end users to mitigate the impact on the performance metric for the productization system.

16. The method of claim 15 further comprising, prior to simulating the impact on the performance metric:

training a machine learning (ML) model to optimize for the performance metric based on the classified productization data,
- wherein the simulation of the impact on the performance metric is based on the ML model.

17. The method of claim 15 further comprising:

predicting, based on the classified productization data, a utilization of the productization system or power consumption by the productization system.

18. The method of claim 15 further comprising, prior to simulating an impact on the performance metric:

receiving a request input to the network portal indicating the performance metric and the productization system.

* * * * *